No. 835,935. PATENTED NOV. 13, 1906.
M. E. CAMPANY.
HARROW.
APPLICATION FILED JULY 18, 1906.

Witnesses
M. C. Lyddane
Daisy Harrison

Inventor
Milton E. Campany
By
W. J. FitzGerald & Co.,
Attorneys

THE NORRIS PETERS CO., WASHINGTON, D. C.

UNITED STATES PATENT OFFICE.

MILTON E. CAMPANY, OF EUPORA, MISSISSIPPI.

HARROW.

No. 835,935.      Specification of Letters Patent.      Patented Nov. 13, 1906.

Application filed July 18, 1906. Serial No. 326,737.

*To all whom it may concern:*

Be it known that I, MILTON E. CAMPANY, a citizen of the United States, residing at Eupora, in the county of Webster and State of Mississippi, have invented certain new and useful Improvements in Harrows; and I do hereby declare the following to be a full, clear, and exact description of the invention, such as will enable others skilled in the art to which it appertains to make and use the same.

My invention relates to new and useful improvements in harrows; and my object is to provide a device of this class which may be used for smoothing the surface of the ground.

A further object is to provide a structure which will cultivate the upper surface of the soil without penetrating to any extent thereinto.

Another object is to provide a harrow which is extremely light and one that may be cheaply constructed and durable and efficient in operation.

Other objects and advantages will be made hereinafter more clearly apparent, reference being had to the accompanying drawings, which are considered a part of this application, and in which—

Figure 1:
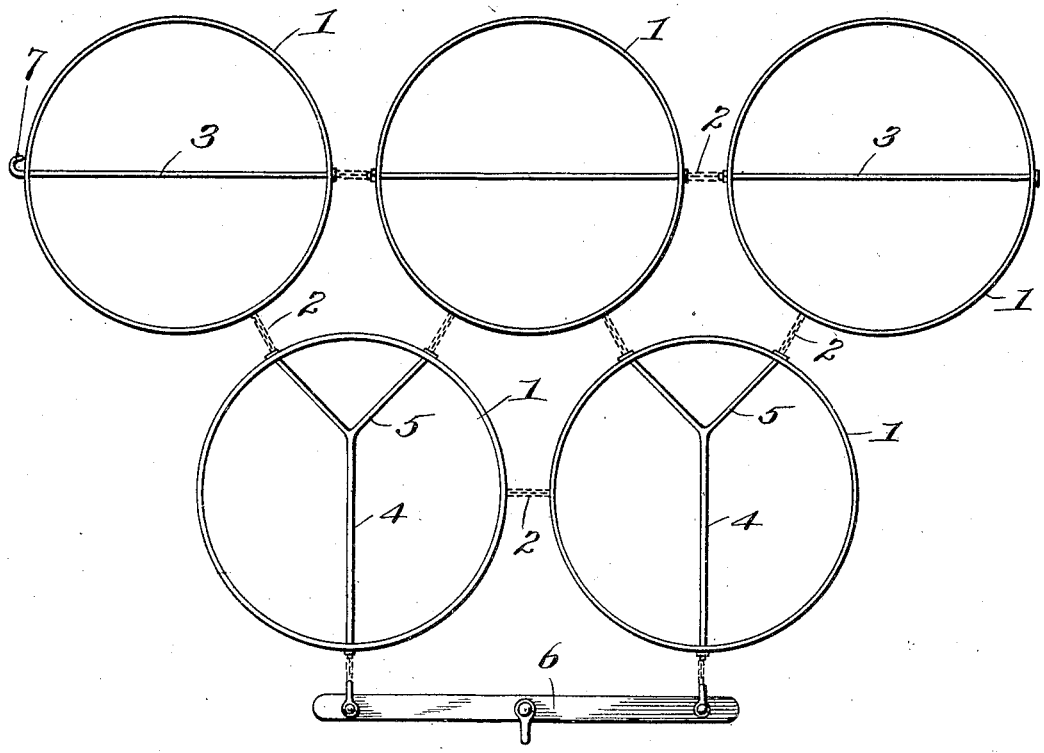
Figure 2:
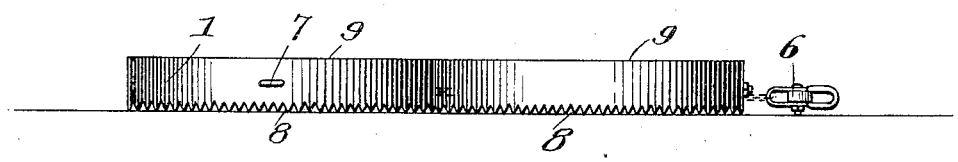

Figure 1 is a top plan view of my improved harrow complete, and Fig. 2 is a side elevation thereof.

Like numerals refer to like parts throughout the drawings.

Referring to said drawings, 1 indicates the harrow-sections, which are preferably formed of a band of metal and disposed in circular shape, said sections being secured together by means of chains or the like 2, each of the rear sections 1 being braced by means of rods 3 passing therethrough, while the front sections are provided with rods 4, said rods having one of their ends bifurcated, as shown at 5.

It will be seen that the chains are secured to the sections 1 adjacent to the rods passing therethrough, so that the strain caused upon said sections 1 will be compensated for by said rods. The sections 1 are preferably arranged as shown in the drawings, three of said sections being in the rear and two in the front thereof; but said sections may be arranged in any preferred manner, and while I have shown the same as circular in form I desire it to be understood that said sections may be made in various shapes.

Secured to the front sections 1 and adjacent to the ends of the rod 4 is a whiffletree 6, to which is adapted to be secured the usual form of doubletree. (Not shown.) One of the rods 3 is extended beyond the section 1 and is provided at its free end with a hook-section 7, said section being designed to receive the doubletrees, so that when it is desired to move the harrow through a small opening the draft-animals may be unhitched from the whiffletree 6 and the doubletrees secured to the hook 7, after which the front sections 1 may be folded back upon the rear sections 1 and the harrow conveyed over the ground by the hook 7. One edge of the sections 1 is provided with teeth 8, while the upper edges thereof, 9, are left smooth, the object being that when it is desired to cultivate the ground that edge of the sections having the teeth 8 is disposed in connection with the earth; but when it is desired to smooth the ground, so that the same may be marked for any desired purpose, the harrow is reversed and the edges 9 placed in connection with the earth, when the above result will be accomplished.

It will be seen that by having the several sections flexibly secured together they will adjust themselves to any unevenness in the ground and cultivate all portions thereof.

What I claim is—

1. A harrow of the class described comprising a plurality of sections, means to flexibly secure said sections together, rods disposed through said sections, a portion of said rods being bifurcated, said sections having one of their edges provided with teeth and their opposite edges left smooth, a whiffletree secured to said sections and a hook upon one of said rods.

2. A harrow of the class described comprising harrow-sections composed of metal bands, one edge of said bands being toothed, the opposite edge thereof left smooth, flexible couplings grouping said sections together, rods extending through a portion of said sections and in line with the couplings, one of said rods having a hook-terminal, bifurcated rods extending through a portion of said sections, and a whiffletree secured to two of said sections and in line with the bifurcated rods whereby said harrow may be operated.

In testimony whereof I have signed my name to this specification in the presence of two subscribing witnesses

MILTON E. CAMPANY.

Witnesses:
H. A. GOULD,
T. L. LAMB.